(No Model.)
C. L. COFFIN.
ELECTRIC WELDING.
No. 409,015. Patented Aug. 13, 1889.
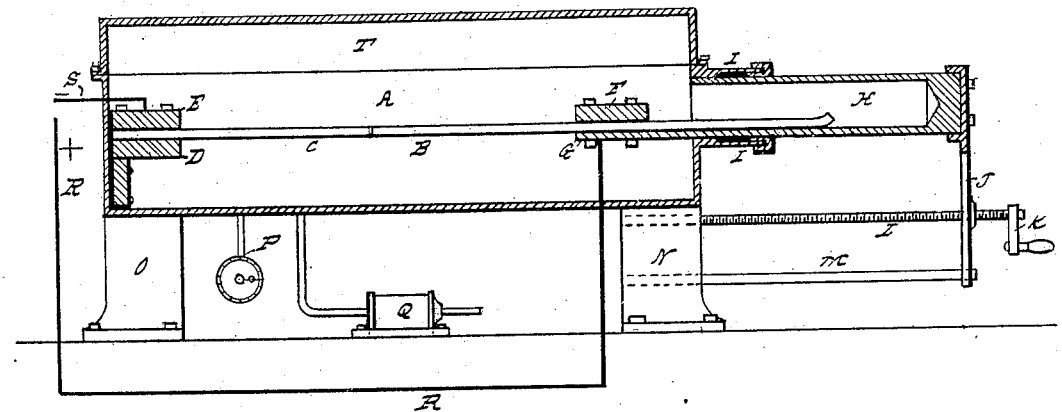
Witnesses
Geo H Lothrop
Adelaide A. Anderson
Inventor
Charles L. Coffin

UNITED STATES PATENT OFFICE.

CHARLES L. COFFIN, OF DETROIT, MICHIGAN.

ELECTRIC WELDING.

SPECIFICATION forming part of Letters Patent No. 409,015, dated August 13, 1889.

Application filed April 24, 1889. Serial No. 308,416. (No model.)

*To all whom it may concern:*

Be it known that I, CHARLES L. COFFIN, of Detroit, in the county of Wayne and State of Michigan, have invented a new and useful Improvement in Electric Welding, of which the following is a specification.

My invention consists in an improved process of welding by electricity, consisting in forming the welding operation *in vacuo*.

The drawing is an elevation, partly in section, of an apparatus which may be used to practice my invention.

There are now known several ways of welding by electricity, in one of which the two articles to be united are connected with the opposite poles of a generator, thus being placed in the electrical circuit, this being known as the "Thomson process," while in others the joint to be welded is submitted to the action of the voltaic arc in various ways, in some of which neither of the articles to be welded is connected with the generator, and in others one or both of the articles to be welded are connected with the generator.

My invention applies to any of these modes of electric welding, the drawing showing it applied only to the first, being simply illustrative of my process.

In the drawing, A represents a tight box having a cover T, which bolts thereto tightly and is supported on legs O and N.

E and D represent the two parts of a clamp carried at one end of the box, but insulated therefrom, designed to firmly hold one of the articles C to be welded.

S represents an electric conductor, by which the clamp E D, and consequently the article C, is connected with one pole of a generator of electricity.

P represents a vacuum-gage connected with box A, and Q represents an air-pump, by which a vacuum may be formed in box A. Of course in using the word "vacuum" I do not mean absolute vacuum, but that which is ordinarily obtained by the use of an air-pump.

I represents a stuffing-box at one end of box A, through which moves air-tight a box H.

J represents a cross-head, one end of which is fastened to the outer end of box H, while the other end is provided with a guide M, which runs in the leg N of the machine.

L represents a screw-rod provided with a crank K, and engaging with leg N and cross-head J, by which the cross-head J may be moved in or out at will.

F G represent a clamp formed on the side of box H, adapted to receive and hold one of the articles to be welded, as B. The clamp F G is connected by the conductor R with the other poles of the generator of electricity.

The operation is as follows: The articles C B being placed in the box A and clamped in the respective clamps with the ends of C B in contact, the cover T is bolted tightly on the box and the air then exhausted from the box A by means of the air-pump Q. A current of electricity is now passed through the articles B C, and by means of the crank K and screw-rod L the ends of said articles B C may be either slightly separated to cause the formation of the voltaic arc between them, and when sufficiently heated pressed together, or they may be pressed together in the first instance, as in the Thomson process. When the weld is completed, the air may be admitted to the box A, the cover T taken off, and the articles B C removed, or the articles welded may be allowed to cool *in vacuo* before being removed. By thus conducting the operation *in vacuo* a current of much less energy is required than when the operation is performed in the open air, and oxidation or scaling is largely prevented.

What I claim as my invention, and desire to secure by Letters Patent, is—

The process of welding metals which consists in placing them in an air-tight chamber, exhausting the air therefrom, and then fusing the metals by electricity, substantially as described.

CHARLES L. COFFIN.

Witnesses:
GEO. H. LOTHROP,
ADELAIDE A. ANDERSON.